Nov 1, 1949. K. REINER ET AL Re. 23,163

CLAMP

Original Filed July 24, 1946

INVENTORS:
KENNETH REINER,
BY ARMAND BRAGA,
Francis D. Ammen,
THEIR ATTY.

Reissued Nov. 1, 1949

Re. 23,163

UNITED STATES PATENT OFFICE 23,163

CLAMP

Kenneth Reiner, Los Angeles, and Armand Braga, Eagle Rock, Calif.; said Braga assignor to said Reiner Original No. 2,459,452, dated January 18, 1949, Serial No. 685,995, July 24, 1946. Application for reissue July 12, 1949, Serial No. 104,325

11 Claims. (Cl. 132—46)

This invention relates to clamps, and while the invention may be employed in the construction of clamps for performing any special function, it is described in the present specification as applied to the construction of a curl clamp. These clamps are employed for clamping the hair to maintain it in a formed curl.

One of the objects of the invention is to provide a clamp of simple construction, which can be readily formed of two members having a correlated construction enabling the same to be attached together in such a way that they can rock upon each other so as to open the clamp to receive the curl, and so that resilient means carried by one of the members will engage the other member in such a way as to urge the clamp toward its closed position.

Another object of the invention is to provide a curl clamp of this general type, which will present a substantially flat side which can be disposed against the side of the head when the clamp is in use for holding a curl in place. In this way ladies' coiffures can be created without subjecting the wearer of the clamp to any discomfort.

Another object of the invention is to produce a clamp of this kind, composed of two members having a correlated construction and form, which will enable the two members to be interlocked with each other when brought into contact with each other, and so as to enable the members to rock upon each other; and at the same time, to afford two handles or pressure points at which pressure may be applied to open up the clamp.

Further objects of the invention will appear hereinafter.

The invention consists in the novel parts and combinations of parts to be described hereinafter, all of which contribute to produce an efficient clamp.

A preferred embodiment of the invention is described in the following specification, while the broad scope of the invention is pointed out in the appended claims.

Figure 1:
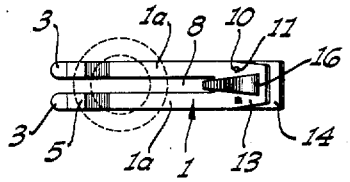
Fig. 1 is a plan of the clamp embodying our invention, the position of the curl being indicated in dotted lines.

In practicing the invention, we prefer to employ two clamping members 1 and 2 which, in the present instance, are in the form of elongated plates which are superposed upon each other.

These members or plates, in practicing the invention, are given a correlated form enabling them to be interlocked with each other to enable the plates to rock upon each other to separate the jaws 3 and 4 that are formed respectively, at adjacent ends of the plates. One of these jaws, for example, the jaw 3, has an offset portion 5 which is offset away from the opposite jaw 4 so that pressure of the two jaws against each other is concentrated at two lines or zones 6 and 7 which would correspond approximately to the diameter of the curl that is to be held by the clamp.

The plates 1 and 2 are preferably formed with longitudinally disposed slots 8 and 9 respectively, so that the upper plate presents two parallel forks 1*a*, and the lower plate presents two parallel forks 2*a*.

Figure 2:
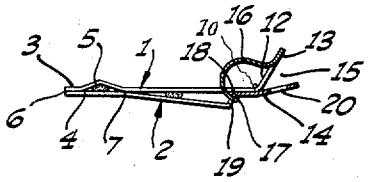
Fig. 2 is a view which is partially a side elevation and partially a section, the section portion being located at the handled end of the clamp.
Figure 3:
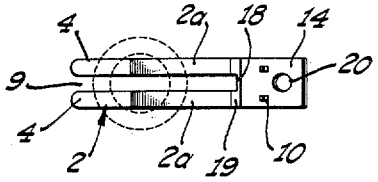
Fig. 3 is a plan of the lower member of the clamp and showing its upper face, that is to say, it is a plan of this part as illustrated in Fig. 2, with the upper clamping member removed.

In order to enable the members 1 and 2 to engage each other in such a way as to prevent these two members from shifting longitudinally with respect to each other, we prefer to provide one or more projecting parts, for example, in the form of spurs such as the spurs 10, struck up from the material of the member 2; and the other member has means, preferably in the form of sockets 11 located to align with the spurs, and through which the spurs project. These sockets in the present instance, are formed in the upper plate 1, as illustrated in Fig. 2, to align with these spurs. The sockets 11 are of greater width than the spurs measured in a direction parallel with the longitudinal axis of the clamp. This permits freedom of rocking movement of the members 1 and 2 upon each other. Furthermore, the openings or sockets 11 are preferably located at a dihedral angle 12 which is produced by bending the adjacent end portion of the clamping member 1 away from the lower member 2 so as to form a handle, or handle extension 13. The other member 2 is also provided with a handle extension 14 which may, if desired, be slightly bent upwardly beyond the location of the spurs 10. In this way, a clearance angle 15 is formed between the two extensions 13 and 14 so as to enable the two handle extensions to be pressed toward each other between the thumb and a finger of the operator of the clamp.

In addition to this, we provide resilient means for normally maintaining the two members 1 and 2 in engagement with each other so as to prevent the spurs 10 from becoming dislodged from the sockets or openings 11, and for performing the other function of maintaining the jaws 3 and 4 of the plates normally in their closed position. In practice, we prefer to form the plates 1 and 2 of sheet material, such as spring steel, or similar material having some resiliency; if desired, we may form this spring means integrally with one of the plates. In the present instance, we bend up a tongue 16 that is struck out of the material of the upper plate 1 to form its slot 8, that is to say, we bend this tongue around into bow form preferably as indicated in Fig. 2, and we provide the end of this tongue with an inwardly bent hook 17 which is hooked over the edge 18 that is formed at the inner end of the slot 9 of the member 2.

Furthermore, at about the location of this edge 18, we prefer to form an offset and dihedral angle 19 in the material of the lower plate, so that from this point the bodies of the two plates 1 and 2 converge toward each other to their contact zone 7 already referred to.

If desired, the handle portion 14 may be provided with an opening or eye 20 through it, which enables the clamp to be hung on a hook or nail for convenience, and which also enables a number of these clamps to be collected together on a ring, or cord.

It will be evident that the resiliency of the bow 16 will yieldingly resist pressure exerted on the handles 13 and 14 to open the jaws of the clamp, and when the handles are released, will close the clamp against the sides of the curl.

The two members 1 and 2 are preferably connected together to produce the clamp by seating the member 1 over the member 2 with the spurs 10 projecting up through the sockets 11; then the jaw end of the plate 1 is swung down against the jaw or plate 2. As this movement is completed, the hook 17 will snap under or "over" the transverse edge 18, which interlocks the two plates to each other.

It should be understood, of course, that when the clamp is applied to a curl, the clamping member 2 will be disposed toward the scalp.

Many other embodiments of the invention may be resorted to without departing from the spirit of the invention.

We claim as our invention:

1. In a clamp for clamping a flat curl on one's head, the combination of two superposed elongated plates extending longitudinally with each other, having integral handles and clamping jaws, said plates having correlated means integral respectively with said plates, said means engaging each other and enabling said plates to rock upon each other toward an open position, one of said plates having a resilient integral extension struck from its material and projecting toward the clamping jaws, engaging the other plate and constantly urging the jaws toward their closed position.

2. In a clamp of the kind described, the combination of two members having clamping jaws, said members having correlated means integral respectively with said members, said means engaging each other and enabling the said members to rock upon each other toward an open position, one of said members having a resilient integral extension projecting toward the clamping jaws, engaging the other member and urging the jaws toward their closed position, each of said members comprising an elongated plate, one of said plates being bent to form a dihedral angle the edge whereof rests against the other plate and functions as a fulcrum on which the plates rock relatively to each other.

3. In a clamp for clamping a flat curl on one's head, the combination of two superposed elongated plates extending longitudinally with each other, having integral handles and clamping jaws, said plates having correlated means integral respectively with said plates, including spur means integral with one of said plates, and socket means on the other plate receiving the spur means, and cooperating therewith to hold said plates against shifting relatively to each other, and forming a rocking connection between said plates, one of said plates having a resilient integral extension of bow-form struck from its material and extending around the axis of said rocking connection, engaging the other plate and constantly urging the jaws toward their closed position.

4. In a clamp of the kind described, the combination of two members having clamping jaws, said members having correlated means integral respectively with said members, including spur means integral with one of said members, and socket means on the other member receiving the spur means and cooperating therewith to hold said members against shifting relatively to each other, one of said members having a resilient integral extension engaging the other member and urging the jaws toward their closed position, each of said members comprising an elongated plate, one of said plates being bent to form a dihedral angle the edge whereof functions as a fulcrum on which that plate rocks.

5. In a clamp of the kind described, the combination of two members having clamping jaws, said members having correlated means integral respectively with said members, including spur means integral with one of said members, and socket means on the other member receiving the spur means and cooperating therewith to hold said members against shifting relatively to each other, one of said members having a resilient integral extension engaging the other member and urging the jaws toward their closed position, each of said members comprising an elongated plate, said plates having the said jaws at one end and having operating handles at their other ends, the member having the said resilient extension having a dihedral angle formed thereon, the edge of said dihedral angle functioning as a fulcrum on which the said members rock.

6. A clamp for clamping a flat curl on one's head, comprising a pair of superposed elongated plates extending longitudinally with each other, having integral handles, and clamping jaws at one end of the clamp, said plates having correlated means including a spur on one of said plates and a socket for the spur on the other plate to prevent shifting of the plates relatively to each other, and enabling said plates to rock upon each other upon an axis, said handles diverging from each other and operating when pressed to separate the jaws, one of said plates having an integral resilient tongue struck from its own material, the root of said tongue being located toward the handle end of the plates, said resilient tongue being bowed adjacent said rocking axis of the two plates with a hook at its end and the other plate having an edge to engage said hook, said hook engaging said edge at a fixed point on the plate having said edge, said resilient tongue operating to constantly urge the jaws to a closed position.

7. A clamp for clamping a flat curl on one's head, comprising two superposed elongated plates extending longitudinally with each other, having integral handles, and clamping jaws at one end of the clamp, said plates having correlated means including a spur on one of said plates and a socket for the spur on the other plate to prevent shifting of the plates relatively to each other and enabling said plates to rock relatively to each other upon an axis, said plates having handle extensions diverging from each other and operating when pressed toward each other to separate the jaws, said handle extension on the plate remote from the wearer's head extending at an angle to the plane of its own jaw, and a resilient bowed tongue integral with one of said plates including material struck from the jaw portion of that plate, said tongue beyond its root extending around said axis and engaging the other plate beyond said axis and constantly operating to press said jaws toward each other.

8. A clamp comprising two superposed plates, said plates having means at corresponding edges functioning as clamping jaws, said plates further having correlated means integral respectively with said plates for preventing shifting of said plates relatively to each other and effecting a connection enabling said plates to rock upon each other; said plates further having handle extensions diverging from each other and operating when pressed toward each other to separate the jaws; one of said plates having a transverse edge, and the other plate having a resilient curved tongue with a hook adjacent its end operating to snap onto said transverse edge, and operating thereafter to hold said plates together and to press said jaws together.

9. A clamp comprising two superposed elongated plates, said plates at one end of the clamp functioning as clamping jaws, said plates having correlated means including a spur on one of said plates and means on the other plate to cooperate with the spur to prevent shifting of the plates relatively to each other, said plates having handle extensions diverging from each other and operating when pressed toward each other, to separate the jaws, one of said plates having an integral resilient tongue with a hook at its end, and the other plate having an edge to engage said hook, said resilient tongue operating to press said jaws toward each other.

10. In a clamp of the kind described, for clamping a flat curl on one's head, the combination of two plate-form members having clamping jaws and handle portions diverging from each other, said members having correlated means integral respectively with said members, said means engaging each other and enabling the said members to rock upon each other upon an axis toward an open position when said handle portions are pressed toward each other, the handle portion of the member that lies remote from the head forming an angle with the plane of the other member substantially at the location of said axis, one of said members having a resilient integral extension struck from its material disposed in a bow extending across the said angle and having its connection to that member located adjacent the handle portion thereof, said bow located adjacent said axis, and the end portion of said resilient extension engaging the other of said members and operating to constantly urge the jaws toward their closed position.

11. In a clamp of the kind described, for clamping a flat curl on one's head, the combination of two plate-form members having clamping jaws and handle portions diverging from each other, said members having correlated means integral respectively with said members, said means engaging each other and enabling the said members to rock upon each other upon an axis toward an open position when said handle portions are pressed toward each other; one of said members having a resilient integral extension struck from its material disposed in a bow and having its connection to that member, located adjacent the handle portion thereof, said bow located adjacent said axis, and the end portion of said resilient extension engaging the other of said members and operating to constantly urge the jaws toward their closed position.

KENNETH REINER.
ARMAND BRAGA.

No references cited.